United States Patent [19]

Greene

[11] Patent Number: 4,909,077

[45] Date of Patent: Mar. 20, 1990

[54] SETTABLE INDEXING DEVICE FOR AIRCRAFT ANGLE OF ATTACK INDICATOR METER

[75] Inventor: Leonard M. Greene, Scarsdale, N.Y.

[73] Assignee: Safe Flight Instrument Company, White Plains, N.Y.

[21] Appl. No.: 380,811

[22] Filed: Jul. 14, 1989

[51] Int. Cl.⁴ .............................................. G01C 21/00
[52] U.S. Cl. ....................................... 73/180; 244/181
[58] Field of Search ............. 73/180, 178 R; 244/181, 244/195

[56] References Cited

U.S. PATENT DOCUMENTS

| | | | |
|---|---|---|---|
| 2,193,077 | 3/1940 | Saxman, Jr. | 73/180 |
| 3,100,612 | 8/1963 | Owen | 244/181 |
| 3,112,905 | 12/1963 | Greene | 244/181 |
| 3,262,311 | 7/1966 | Gwathmey | 244/181 |

Primary Examiner—Donald O. Woodiel
Attorney, Agent, or Firm—Edward A. Sokolski

[57] ABSTRACT

An indicator meter which may comprise a galvonometer is mounted in a casing having an indexing pointer or "bug" mounted for movement thereon relative to the pointer of an aircraft angle of attack indicator. The settable indexing pointer and the bezel of the casing are integrated with a variable resistor. A reference voltage is fed to the variable resistor such that a voltage is generated which is in accordance with the positioning of the indexing pointer. Thus, a voltage is generated in accordance with the pointer setting which represents the value of a desired angle of attack. The pointer can be set to represent a desired angle of attack with the meter indicating the measured angle of attack. Voltages representing the measured and desired value of angle of attack are compared with a difference or "error" signal is generated. This error signal is used to control the flight of an aircraft either automatically or by operator action to eliminate the error signal and bring the meter reading and the settable indexing pointer to coincidence.

4 Claims, 2 Drawing Sheets

SETTABLE INDEXING DEVICE FOR AIRCRAFT ANGLE OF ATTACK INDICATOR METER

BACKGROUND OF THE INVENTION

1. Field of the Invention

This invention relates to control systems used in controlling angle of attack in flying an aircraft and more particularly to such a system employing a metering device which indicates a measured parameter which is integrated with a settable indexing device on which the desired value of the measured parameter can be set by an operator and electrical voltages representing the measured and set values are compared to provide an error control signal.

2. Description of the Related Art

In the control of the flight of an aircraft, there are certain significant parameters such as the angle of attack which must be continually monitored and the operation controlled to keep such parameters at a predesired value. This end result is often achieved by generating an output voltage representing the measured parameter by means of a potentiometer, the arm of which is driven by a device which senses the parameter. A measuring device of this type for measuring the angle of attack of an aircraft is described in Pat. No. 2,193,077 to Saxman, Jr. Resistive devices are also used in the prior art for generating a voltage in accordance with the manual setting of a reference pointer, such as described in Pat. No. Re25,674 to Hartifan, et al. and Pat. No. 3,697,922 to Hammond. Other prior art references generally involved with this subject matter include Pat. No. 3,514,997 to Gwathmey, et al. Pat. No. 1,986,695 to Warner and Pat. No. 1,142,134 to Barrows.

SUMMARY OF THE INVENTION

The system of the present invention combines certain of the features of the prior art in integrating an indicator device which indicates the angle of attack of an aircraft with a settable pointer or "bug" which can be set to indicate a desired value of angle of attack. The pointer of a bezel on the casing for the indicator device are integrated with a variable resistor from which a voltage representing this desired value can be generated.

In the preferred embodiment of the invention, an electrical signal representing the angle of attack at which an aircraft is being flown is compared with a voltage representing a desired angle of attack, as indicated by the setting of an indexing pointer. Such pointer and the indicator bezel are integrated with a variable resistor; the voltage provided from this variable resistor representing the angle of attack setting which may be manually set by the pilot. The voltage is compared with the voltage representing the actual angle of attack at which the aircraft is being flown and an "error" signal which is the difference between these two values is generated. This error signal may be "zeroed" by the pilot's flying of the aircraft or may be used in a flight control system to achieve this end result.

It is therefore an object of this invention to provide an improved system for generating a control voltage in accordance with the difference between the measured value of the angle of attack of an aircraft and a desired value of this parameter as set on a reference by means of a pointer or "bug".

Other objects of the invention will become apparent as the description proceeds in connection with the accompanying drawings of which:

DETAILED DESCRIPTION OF THE INVENTION

Figure 2:
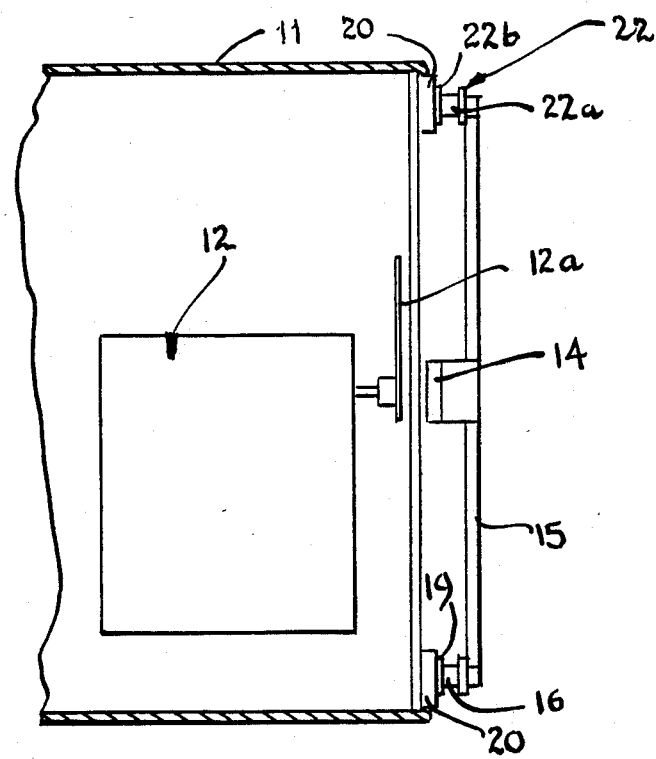
FIG. 2 is a cross sectional view taken along the plane indicated by 2—2 in FIG. 1.
Figure 1:
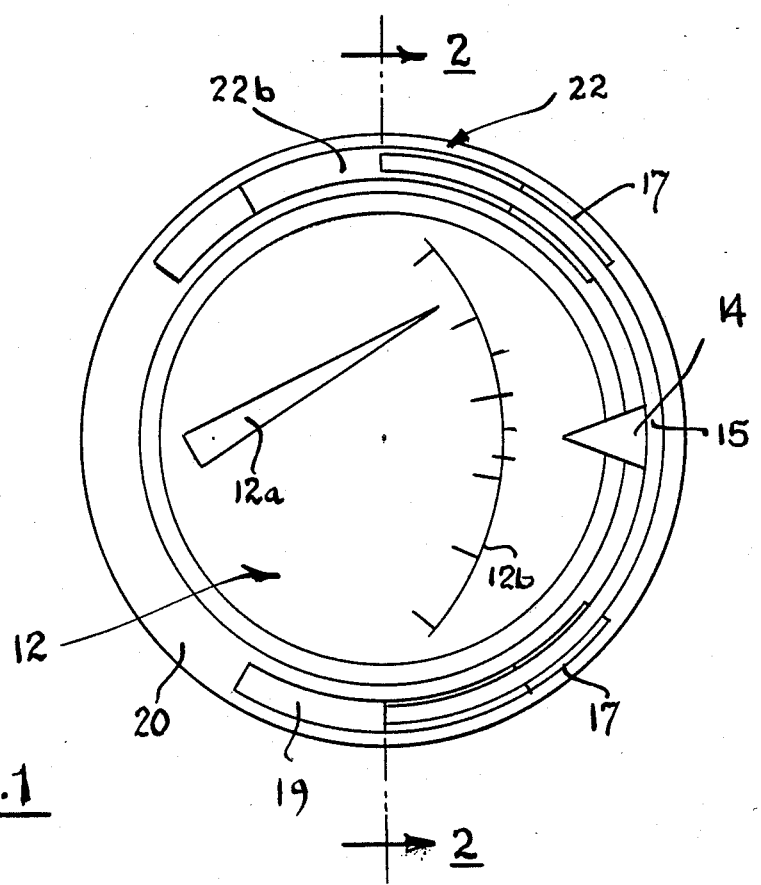
FIG. 1 is a front elevational view of a preferred embodiment of the instrument of the invention.

Referring to FIGS. 1 and 2, a preferred embodiment of the instrument of the invention is illustrated. Instrument casing 11, which is preferably sealed, has a galvonometer 12 mounted therein, this galvonometer receiving an electrical voltage representing the angle of attack at which an aircraft is being flown. The pointer 12a of the galvonometer moves opposite scale 12b to indicate angle of attack. Indexing pointer or "bug" 14 is fixedly mounted on holder member 15. Holder member 15 has a pair of brushes 16a and 16b on opposite ends thereof. Holder member 15 is semi-circular and is slidably retained on instrument case 11 by means of retainer members 17 which extend upwardly from the top surface of the casing. A slip ring 19 is fixedly installed on ring shaped top bezel 20 of casing 11, brush 16b riding along this slip ring as the pointer is being positioned.

Electrically conductive brush 22a rides on resistance element 22b, which is integrated with bezel 20 of casing 11. Thus, as indexing pointer 14 is positioned along scale 12b, the resistance between brush 22a and either end of resistance element 22b is varied, these resistance elements thus forming a variable resistor which is integrated with the pointer and bezel.

Figure 3:
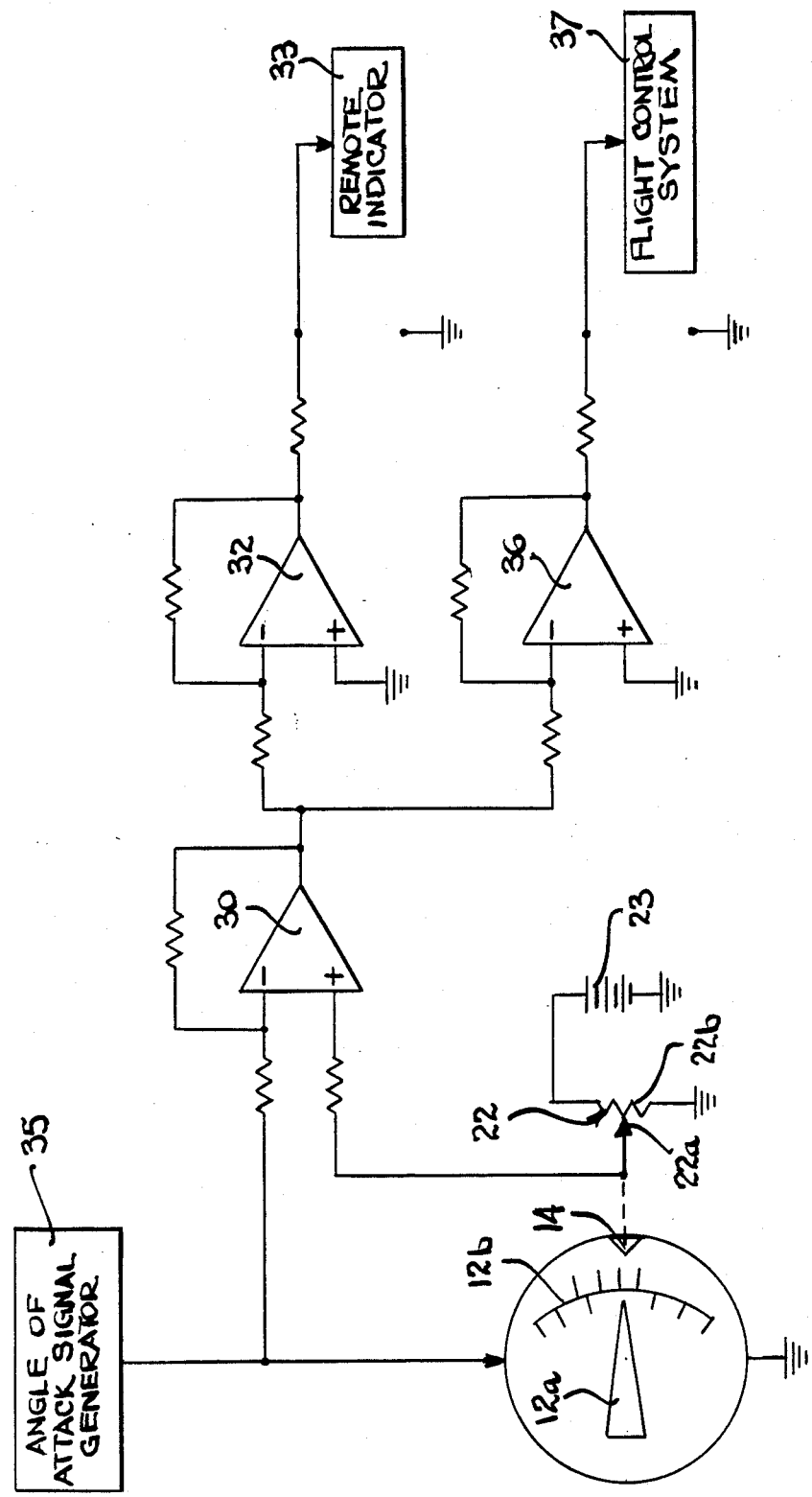
FIG. 3 is a schematic view illustrating the incorporation of the instrument of the invention into a flight control system.

Referring now to FIG. 3, the implementation of the instrument of the invention in a flight control system is schematically illustrated. A reference voltage is placed across resistance element 22b, this voltage being supplied by voltage source 23. As indexing pointer 14 is set to a desired position representing a desired angle of attack, the brush 22a of variable resistor 22 is moved to change the voltage at this brush. This voltage is fed to differential amplifier 30. Also fed to differential amplifier 30 is a voltage in accordance with the actual angle of attack of the aircraft which is generated by angle of attack signal generator 35, which includes an angle of attack sensor.

The output of differential amplifier 30 is an error signal representing the difference between the measured angle of attack and the angle of attack setting of indexing pointer or "bug" 14, set by the pilot. This angle of attack error signal is amplified by means of amplifier 32 and fed to a remote indicator 33 which may be used by the pilot to fly the error signal to "0". The error signal is also fed to amplifier 36 and from this amplifier to the aircraft's flight control system 37 where this error signal may be automatically zeroed by this system.

The instrument and system of the invention thus provide a simple relatively inexpensive yet highly effective means for controlling the angle of attack of an aircraft. While the invention has been described and illustrated in detail, it is to be clearly understood that this is intended by way of illustration and example only and is not to be taken by way of limitation, the spirit and scope of the invention being limited only by the terms of the following claims.

I claim:

1. In a system for displaying the angle of attack of an aircraft, said system including means for generating a first voltage in accordance with the measured value of the angle of attack, means responsive to said first voltage for providing an indication of said measured value, means for generating a second voltage in accordance with a predesired value of the angle of attack, and means for comparing said first and second voltages and generating an error signal in accordance with the difference therebetween, the improvement comprising a settable reference device for generating said second voltage and providing an indication thereof comprising:

a variable resistor having a movable contact portion and a fixed portion along which the moveable portion slides,
   an indicator scale,
   an indexing pointer integrally formed with the movable contact portion of said variable resistor and positionable along said indicator scale to indicate the predesired value of said parameter,
   said means for providing an indication of said measured value indicating said value on said indicator scale, and
   means for providing a reference voltage across the fixed portion of said variable resistor,
   the voltage at the movable contact portion of said variable resistor being said second voltage which is compared with said first voltage to provide the error signal.

2. The system of claim 1 wherein the means for providing an indication of said measured value comprises a galvanometer having a pointer which moves along said scale, a casing in which said galvanometer is mounted, a holder slidably mounted on said casing, said indexing pointer being fixedly supported on said holder for movement therewith, said holder having an electrically conductive brush extending therefrom, the fixed portion of said variable resistor being integrated with said casing,
   said brush forming the movable contact portion of said variable resistor.

3. The system of claim 2 wherein said holder is arcuate in shape, said settable pointer being movable along an arcuate path.

4. The system of claim 3 wherein said holder is semicircular in shape, said electrically conductive brush being near one end of said holder, there being a second brush extending from said holder near the end opposite to said one end thereof, and a slip ring mounted on said casing on which said second brush rides.

* * * * *